United States Patent
Hara et al.

(10) Patent No.: US 8,427,726 B2
(45) Date of Patent: Apr. 23, 2013

(54) HOLLOW REFLECTING OPTICAL ELEMENT AND SCANNING OPTICAL DEVICE

(75) Inventors: Shinichiro Hara, Hachioji (JP); Naoki Kaneko, Hachioji (JP); Hiroshi Takagi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 45 days.

(21) Appl. No.: 13/257,546

(22) PCT Filed: Feb. 4, 2010

(86) PCT No.: PCT/JP2010/051603
§ 371 (c)(1),
(2), (4) Date: Sep. 19, 2011

(87) PCT Pub. No.: WO2010/106845
PCT Pub. Date: Sep. 23, 2010

(65) Prior Publication Data
US 2012/0008184 A1    Jan. 12, 2012

(30) Foreign Application Priority Data
Mar. 19, 2009    (JP) .................................. 2009-067960

(51) Int. Cl.
G02B 26/08        (2006.01)
(52) U.S. Cl.
USPC ...................... 359/208.1; 359/216.1; 359/848
(58) Field of Classification Search .... 359/216.1–219.2, 359/205.1, 207.1–207.5, 208.1, 848, 868–869, 359/871
See application file for complete search history.

(56) References Cited

U.S. PATENT DOCUMENTS

| | | | |
|---|---|---|---|
| 5,301,060 A | 4/1994 | Niikawa et al. | |
| 2006/0262372 A1 | 11/2006 | Hayashi | |
| 2012/0008183 A1* | 1/2012 | Hara et al. | 359/205.1 |

FOREIGN PATENT DOCUMENTS

| | | |
|---|---|---|
| JP | 6-175006 | 6/1994 |
| JP | 2001-105449 | 4/2001 |
| JP | 2001-124912 | 5/2001 |
| JP | 2001-188113 | 7/2001 |
| JP | 2002-277803 | 9/2002 |
| JP | 2003-262816 | 9/2003 |
| JP | 2004/025789 | 1/2004 |
| JP | 2004-170607 | 6/2004 |

* cited by examiner

Primary Examiner — James Phan
(74) Attorney, Agent, or Firm — Cozen O'Connor

(57) ABSTRACT

Provided are a resinous reflecting optical element that achieves high mirror surface precision by mitigating the warping effects associated with contraction during resin hardening and suppressing the distortion of a mirror surface that results from resistance to mold release, and a scanning optical device that uses said reflecting optical element. The reflecting optical element is characterized by having a long, tabular substrate (3), a mirror surface section (2) positioned on one surface of the substrate (3), and a hollow portion (4) positioned within the interior of the substrate (3), and is also characterized in that, as a result of configuring so that the hollow portion (4) is longer than the mirror surface section (2), warping and sink marks which form due to contraction during resin hardening are mitigated across the entire mirror surface section (2), and in that the entire mirror surface section (2) protrudes above the surface of the substrate (3), thereby suppressing the increase in resistance to mold release that occurs when a metallic mold is gripped by the molding during resin contraction, and preventing distortion of the mirror surface section (2) that is caused by resistance to mold release.

8 Claims, 7 Drawing Sheets

FIG. 3a
FIG. 3b
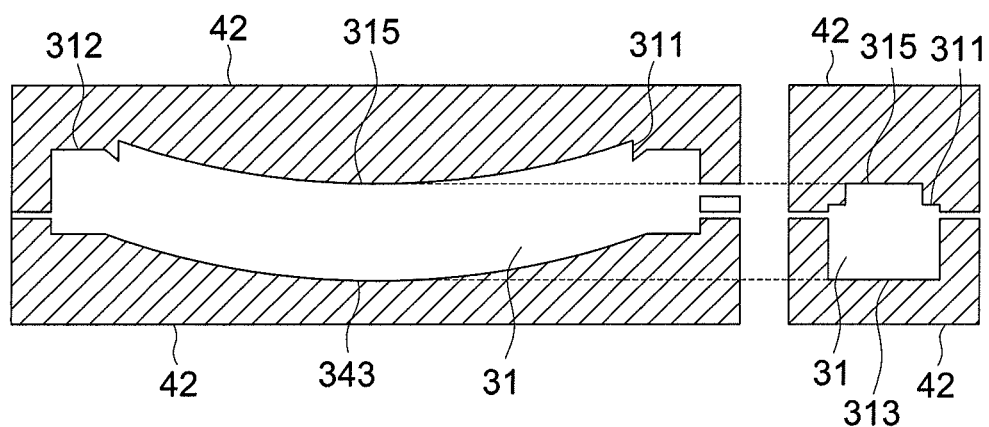
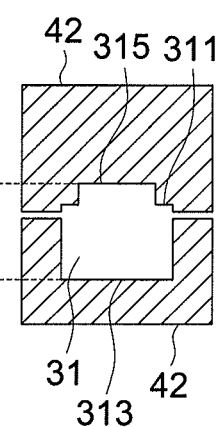

HOLLOW REFLECTING OPTICAL ELEMENT AND SCANNING OPTICAL DEVICE

RELATED APPLICATIONS

This application is a U.S. National Phase Application under 35 USC 371 of International Application PCT/JP2010/051603 filed Feb. 4, 2010.

This application claims the priority of Japanese application No. 2009-067960 filed Mar. 13, 2009, the entire content of which is hereby incorporated by reference.

FIELD OF THE INVENTION

The present invention relates to a reflecting optical element constituting an optical system used in a scanning optical device and image forming device, particularly to a resin-made reflecting optical element having a hollow portion formed in the element.

BACKGROUND OF THE INVENTION

In a conventional image forming apparatus such as a copying machine or printer, the laser scanning optical device for forming an electrostatic latent image on a photoreceptor has often used a long-sized optical element as an optical element for providing the fθ characteristic (a characteristic for ensuring that an optical beam deflected by a polygon mirror or the like is scanned on a surface to be scanned at a equidistant speed), for example. In such an optical element, a prescribed warping is kept with a high accuracy particularly in the scanning direction so that the optical path of the laser beam is adjusted; for example, the main scanning speed is adjusted when the laser beam passes through the optical element or is reflected by the same.

The aforementioned optical element made of glass, metal or ceramics is widely known. In recent years, a resin-made optical element has come to be employed in view of molding ease, greater freedom of designing, and reduced costs.

In the meantime, as a laser beam, the attention of the industry is focused on a short-wave light source having a wavelength of 500 nm or less, particularly in the vicinity of 400 nm in recent years because it provides high definition image recording, enhanced recording density, longer-service life and stable output. There is a need to use a resin-made optical element as a means for adjusting the optical path of the light emitted from this light source.

When the scanning optical device for adjusting the optical path of laser beam by means of a transparent type refraction optical element disclosed in the Patent Literature 1, namely, a transparent lens, is structured in such a way that the laser beam from the short-wave light source is used as the laser beam and a resin-made lens is used as the transparent lens for adjusting the optical path of laser beam, a short-wave laser beam will pass through the resin, and weatherability of the resin-made lens comes into question.

To solve the problem of weatherability, the present inventor considered use of a mirror for reflecting the laser beam, namely, a reflecting optical element as a means of adjusting the laser beam optical path, without using a transparent lens, namely, a transparent refraction type optical element that allows laser beam to pass through.

This is because of the following reason: A transparent optical element requires countermeasures to be provided to ensure weatherability, including the interior of the lens wherein light passes through. By contrast, the reflecting lens surface requires such countermeasures to be taken only for the reflecting optical element. This is a great advantage.

However, the following new problem arises in this case: When a reflecting optical element is used to adjust the optical path of the laser beam, the surface precision required for the profile of the reflecting optical surface is about four times that required for the transparent lens. This is because of the following reasons: In the case of the transparent lens, the entrance and exit surfaces of the lens are used to adjust the optical path of the laser beam and beam profile. By contrast, in the case of a reflecting optical element, the optical path of the laser beam and beam profile are adjusted by one reflecting surface.

In the optical element wherein the profile of the optical surface is required to ensure a high degree of surface precision, particularly in the optical element for adjusting the main scanning speed of the laser beam, there will be an increased impact on the deformation of the optical surface given by the warping or sink marks resulting from contraction during resin hardening, and on the warping produced in the direction of length, i.e., in the scanning direction, making it difficult to perform molding with such a high degree of surface precision maintained, even if the conventional injection molding procedure is utilized.

To solve this problem, the present inventors paid attention to the effect of the hollow injection molding, and considered application of hollow injection molding to the optical components. Tensile stress during resin contraction that may cause warping and sink marks of the molded products is released to the hollow portion by hollow molding according to hollow injection molding process. Then a sink marks appears on the surface of the hollow portion, thereby suppressing the warping and sink marks occurring on the surface of the hollow portion. This enhances surface precision, i.e., the mirror surface precision in the reflecting optical element.

The hollow injection molding technique is disclosed in Patent Literature 2. According to this technique, the hollow portion is designed wider than the mirror surface section of the reflecting optical element to achieve the effect of formation of a hollow portion over the entire mirror surface section. This technique will be advantageous in the sense the tensile stress during resin contraction is released to a certain extent by formation of a hollow portion over the entire mirror surface section.

However, this conventional technique has been found to be insufficient to maintain the surface precision required of the aforementioned reflecting optical element, particularly the reflecting optical element employed in the scanning optical device using the short-wave light source.

BACKGROUND ART DOCUMENT

Patent Literature

Patent Literature 1: Japanese Unexamined Patent Application Publication No. 2003-262816
Patent Literature 2: Japanese Unexamined Patent Application Publication No. 2001-124912

SUMMARY OF THE INVENTION

Problems to be Solved by the Invention

In the reflecting optical element disclosed in the Patent Literature 2, it has been found out that a serious distortion occurs to the periphery of a mirror surface section at the time of mold release in the molding operation. This is because of the following reasons: The mirror surface section is form in a concave in such a way as to be gripped inside the substrate, namely, the periphery of the substrate is protruding. Accordingly, the resin molded article (reflecting optical element) contracts during resin hardening and the mold on the periphery of the mirror surface section is gripped by the protrusion of the mirror surface section in the resin molded article (reflecting optical element). This results in an increase in resistance to mold release.

The problem with resistance to mold release is not very serious in the reflecting optical element employed in a conventional scanning optical device of longer wave length. It has been found out, however, that, in the reflecting optical element of a device using a short-wave light source required to ensure a higher degree of surface precision, the surface roughness affecting the surface precision of the mirror surface section serving as a reflecting surface thereby will be deteriorated by the distortion at the time of mold release. Even if the problem with the contraction of resin can be solved by hollow molding, a high degree of surface precision cannot be ensured, as a result.

The object of the present invention is to solve the aforementioned problem and to provide a resin-made reflecting optical element characterized by a high degree of mirror surface precision which is achieved by mitigating the impact of warping and sink marks resulting from contraction during resin hardening, and by sufficiently suppressing the distortion of the mirror surface section caused by mold releasing resistance, or a scanning optical device using this reflecting optical element.

Means for Solving the Problems

To achieve the aforementioned object, the first embodiment of the present invention has a longer tabular resin-made substrate having a hollow portion, and a mirror surface section located at part of the substrate surface. The hollow portion is located inside the substrate with the mirror surface section formed thereon, and is longer than the distance from the center of the mirror surface section to both ends of the mirror surface section in the direction of length, and the mirror surface section is a reflecting optical element wherein the entire mirror surface section protrudes above the surface of the substrate.

Further, the hollow portion is preferably longer than the distance from the center of the mirror surface section to both ends of the mirror surface section in the direction of width.

The reflecting optical element preferably reflects the light emitted from the light source during the operation of scanning along the surface of the mirror surface section in the direction of length.

Further, the surface roughness Ra on the surface of the substrate with the mirror surface section of the reflecting optical element formed thereon is preferably formed within the range of Ra≦5 (nm).

Another embodiment of the present invention is a scanning optical device provided with: a light source and polygon mirror; a converging means for inputting the light emitted from this light source and converging this light onto the polygon mirror; and a reflecting optical element for providing fθ characteristic to the light scanned by rotation of the polygon mirror at a prescribed speed. The aforementioned reflecting optical element includes a long tabular resin-made substrate provided with a hollow portion and a mirror surface section located at part of the substrate. The hollow portion is positioned inside the substrate wherein the mirror surface section is formed, and is longer than the distance from the center of the mirror surface section to both ends of the mirror surface section in the direction of length. The mirror surface section is characterized in that the entire mirror surface section protrudes above the surface of the substrate.

Further, the hollow portion of the reflecting optical element used in the scanning optical device is preferably longer than the distance from the center of the mirror surface section to both ends of the mirror surface section in the direction of width.

Further, the surface roughness Ra on the surface of the substrate with the mirror surface section of the reflecting optical element used in the reflecting optical device is preferably formed within the range of Ra≧5 (nm).

The wavelength of the light emitted from the light source is preferably 500 nm or less.

Effects of the Invention

As described above, according to the present invention, there is provided a resin-made reflecting optical element including a hollow portion, and this hollow portion is formed inside the substrate to be longer than the mirror surface section in the direction of length, namely, in the scanning direction. This structure ensures that the warping that occurs in the direction of length due to contraction during resin hardening is mitigated across the entire mirror surface section. Further, the entire mirror surface section protrudes above the surface of the substrate. This suppresses an increase in resistance to mold release that occurs when a mold is gripped by the resin molded product during contraction of the resin molded product. Thus, the present invention provides a resin-made reflecting optical element characterized by the mirror surface precision higher than that of the conventional element.

Further, use of the reflecting optical element provides a scanning optical device and image forming device using a blue laser capable of high definition image recording, at less expensive costs than the conventional equipment using glass-, metal- or ceramic-made optical element.

BRIEF DESCRIPTION OF THE DRAWINGS

FIG. 1 is a schematic diagram representing the profile of a reflecting optical element in a first embodiment of the present invention, wherein FIG. 1a is a top view of the reflecting optical element as observed from the direction of depth, while

FIG. 2 is a schematic diagram representing the method of molding a reflecting optical element in a first embodiment of the present invention, wherein FIG. 2a is a top view of the reflecting optical element as observed from the direction of depth, while

FIG. 3 is a schematic diagram representing the profile of a mold, wherein FIG. 3a is a cross sectional view being cut by the perpendicular surface including the bisector in the direction of width, while FIG. 3b is a cross sectional view being cut by the perpendicular surface including the bisector in the direction of length;

FIG. 7 is a schematic diagram representing the profile of a reflecting optical element in a variation of the first embodiment of the present invention, wherein FIG. 7a is a top view of the reflecting optical element as observed from the direction of depth, while

DESCRIPTION OF EMBODIMENTS

Embodiment 1

Figure 1A:
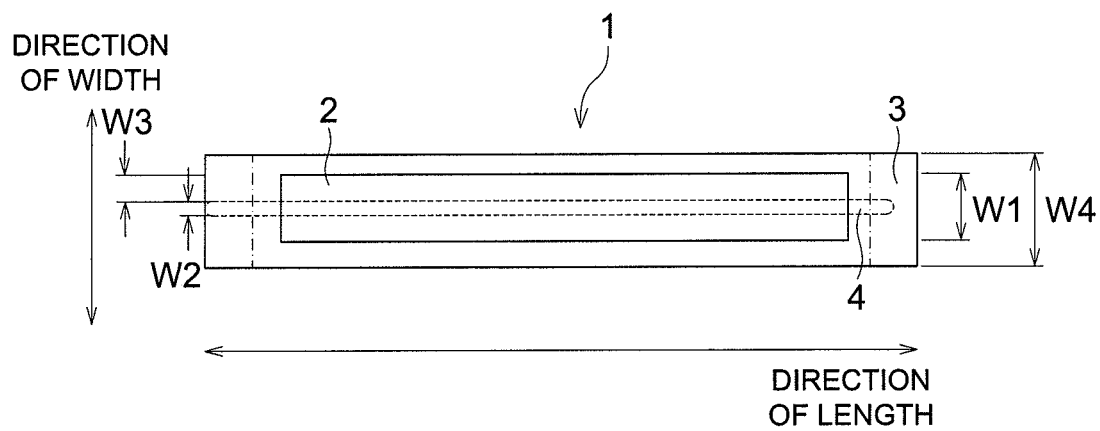
Figure 1B:
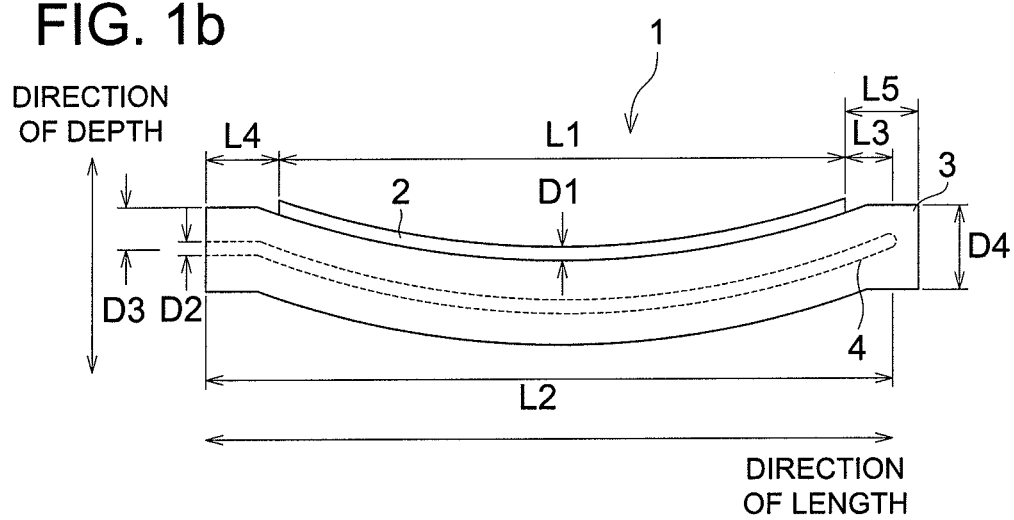
FIG. 1b is a top view of the reflecting optical element as observed from the direction of width.

FIG. 1 is a schematic diagram representing the profile of a resin-made reflecting optical element having a hollow portion which is longer in the direction of length than the mirror surface section, in a first embodiment of the present invention. FIG. 1a is a top view of the reflecting optical element as observed from the direction of depth, while FIG. 1b is a top view of the reflecting optical element as observed from the direction of width.

(Profile of Optical Element)

The resin-made reflecting optical element of the present embodiment (hereinafter also referred to as "reflecting optical element of the present embodiment") includes: a long tabular substrate 3; a mirror surface section 2 positioned on one surface of the substrate 3; and a hollow portion 4 positioned inside the substrate 3 on the back surface of the mirror surface of the mirror surface section 2, and the length of the hollow portion 4 in the direction of length is greater than that of the mirror surface section 2 in the direction of length. Further, both ends of the hollow portion 4 are formed outside the mirror surface section 2 in the direction of length. This structure ensures that the tensile stress occurring due to contraction of resin during resin hardening is released to the hollow portion 4. Thus, the warping caused by resin contraction in the direction of length is mitigated over the entire mirror surface section 2, with the result that the surface precision is enhanced.

The conventional method has problems of gripping of the mold by the molded product due to the resin contraction, and the distortion of the mirror surface section 2 that results from resistance to mold release. These problems can be solved by allowing the mirror surface section 2 to project from the substrate 3 over the ensure surface in the direction of depth, thereby mitigating the distortion of the mirror surface section 2 resulting from resistance to mold release. Further, the profile of the mirror surface may be changed by correction of the mirror surface at the time of manufacturing the optical element (resin molded product), for example, by cutting the mirror surface section 2 in the direction of depth. The surface of the mirror surface section 2 may be embedded into the substrate 3 by correction. In this case, the length wherein the mirror surface section 2 protrudes from the substrate 3 in advance can be adjusted in anticipation of the amount of correction of the mirror surface section 2. This adjustment allows the surface of the mirror surface section 2 to project from the surface of the substrate 3 after correction as well, with the result that gripping of the mold by the molded product is avoided.

In the reflecting optical element of the present embodiment, assume that the length of the mirror surface section 2 in the direction of length is L1; the length in the direction of width is W1; the length of the hollow portion 4 in the direction of length is L2; the length in the direction of width is W2; the length in the direction of depth is D2; the length of the substrate 3 in the direction of width is W4, and the distance from the end of the mirror surface section to the end of the substrate with reference to one side in the direction of length is L5. On this assumption, the distance L3 from the end of the mirror surface section to the end of the hollow portion with reference to one side in the direction of length can be expressed as $0 \leq L3 < L5$, and the distance W3 from the end of the mirror surface section to the end of the hollow portion with reference to one side in the direction of width can be expressed as $0 \leq W3 < W2/2$. The structure is preferably designed to meet these expressions.

The length D1 of the mirror surface section 2 protruding from the surface of the substrate 3 in the direction of width can be expressed by $0.1 \text{ (mm)} < D1 < 3 \text{ (mm)}$. When mold release is taken into account, the lateral area of the mirror surface section, hence, resistance to mold release, will be increased, with the result that the mirror surface precision on the periphery will be deteriorated. Thus, the expression $0.1 \text{ (mm)} < D1 \leq 0.3 \text{ (mm)}$ is preferably satisfied.

The relationship between the length W1 of the mirror surface section 2 in the direction of width and the length W2 of the hollow portion 4 preferably meets the expression $0.01 \leq W2/W4 \leq 1$.

In FIGS. 1a and 1b, the hollow portion 4 is placed at the center both in the direction of width and in the direction of depth, and is illustrated in a straight line in parallel with the mirror surface section 2. This is meant only for schematic illustration, without giving any restriction to the profile or positional relationship of the hollow portion 4.

(Material of Substrate)

The following describes the material of the reflecting optical element in the present embodiment: The resin material constituting the substrate of the reflecting optical element is exemplified by polycarbonate, polyethylene terephthalate, polymethyl methacrylate, cycloolefin polymer or a resin made of two or more of these substances. In the reflecting optical element, use of polycarbonate and cycloolefin polymer is particularly preferred.

(Material of Mirror Surface Section)

The following describes the material constituting the mirror surface section of the reflecting optical element. Examples of the material constituting the mirror surface section include silicon monoxide, silicon dioxide, and alumina, for example. Any commonly known method such as a vacuum vapor deposition method, sputtering method or ion plating method can be used to form a film.

(Molding Method)

Figure 2A:
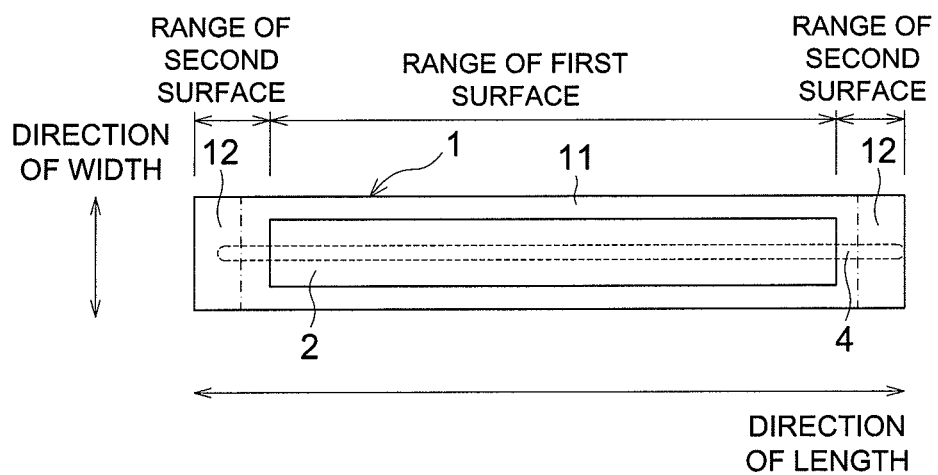
Figure 2B:
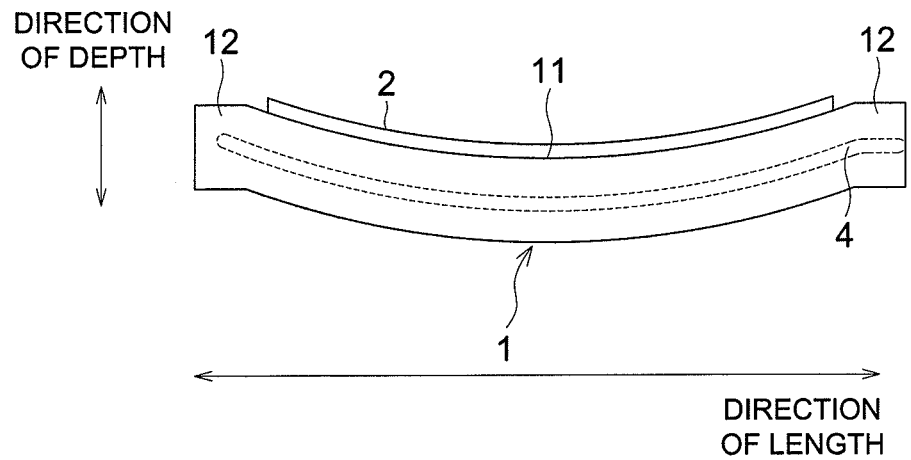
FIG. 2b is a top view of the reflecting optical element as observed from the direction of width.
Figure 4:
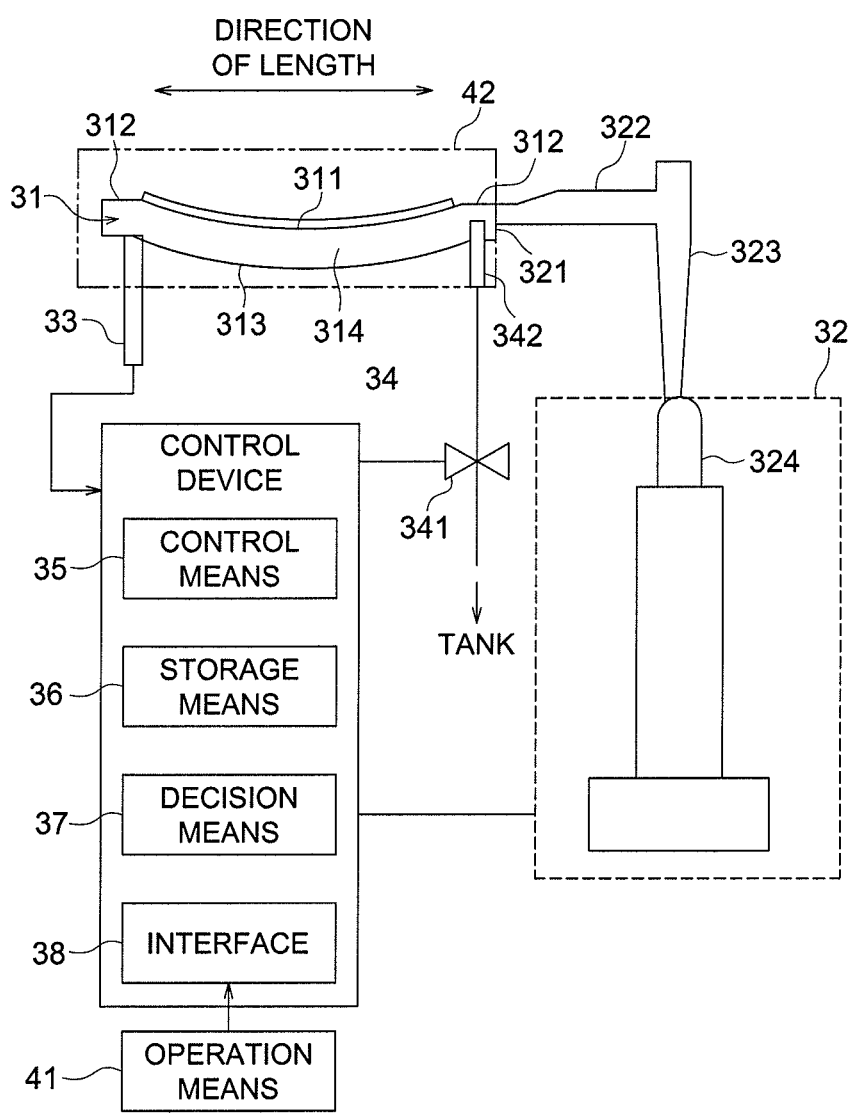
FIG. 4 is a functional block diagram showing the injection molding machine provided with a detecting means.
Figure 6:
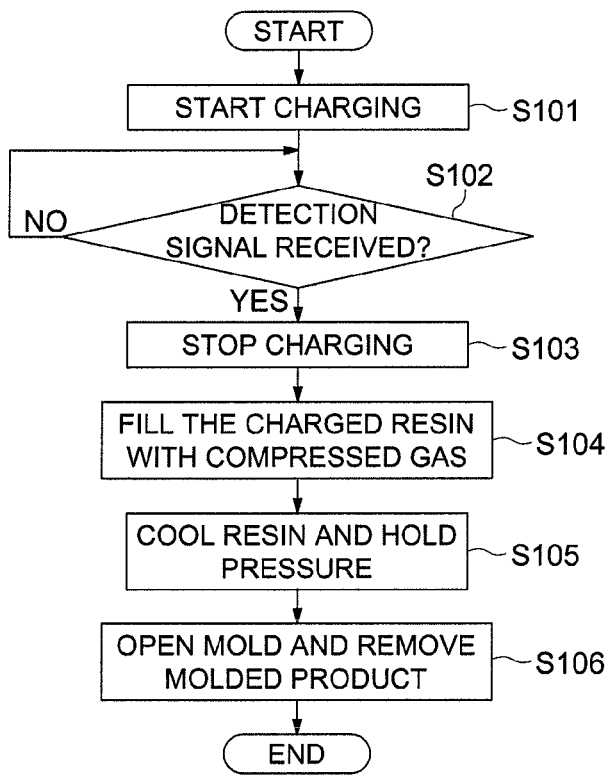
FIG. 6 is a flow chart showing the operations from the step of filling the mold cavity with resin to the step of removing the molded product from the mold.

The following describes a method for molding the reflecting optical element with reference to FIGS. 2, 4, 3 and 6: FIG. 2 is a schematic diagram representing the method of molding a reflecting optical element in the present embodiment. FIG. 4 is a functional block diagram showing the injection molding machine provided with a detecting device used in the step of molding in the present embodiment. FIG. 3 is a schematic diagram representing the profile of a mold. FIG. 6 is a flow chart showing the operations from the step of filling the mold cavity with resin to the step of removing the molded product from the mold.

The injection molding machine used for molding includes a mold 42 equipped with a cavity 31, a charging means 32 for charging the cavity 31 with resin, a detecting means 33 for detecting the tip end at the time of resin injection, a gas filling means 34 for filling compressed gas into the resin having been charged, and a control means 35 for controlling the start and stop of resin charging operation, and start and stop of compressed gas filling operation.

(Mold)

The cavity 31 has an internal surface for forming the first surface portion 11 and second surface portions 12 constituting the outer surface of the resin molded article for the optical element. Referring to FIG. 3, the following describes the profile of the mold 42. FIG. 3a is a cross sectional view of the mold 42 when cut by a perpendicular line including a bisector in the direction of thickness. FIG. 3b is a cross sectional view of the mold 42 when cut by a perpendicular line including a bisector in the direction of length between the internal surfaces of the cavity 31 including a first region 311 for forming the first surface portion 11 and a second region 312 for forming the second surface portions 12.

In the mold 42 on the side (top surface side) in contact with the first region 311 and second region 312 of the cavity 31, the portion corresponding to the first region 311 of the cavity 31 is provided with a mirror surface forming section 315 as a convex portion. When the mirror surface forming section 315 is provided, the mirror surface section 2 is formed in such a way as to protrude over the first surface 11. Gripping of the mold by the molded product does not occur, despite hardening and contraction of the resin molded product (reflecting optical element), so that the resistance to mold release is mitigated when the mold 42 on the stop surface side is removed.

Here, to achieve the surface precision used in the short-wave having a wavelength of 500 nm or less, the mirror surface forming section 315 is machined to a surface roughness Ra of 5 mm or less. This surface roughness Ra is preferably in the range of 2 to 3 nm or less.

Referring to FIG. 4, the mechanism surrounding the mold 42 in an injection molding machine will be described. A gate 321, runner 322 and spool 323 are formed continuously on the cavity 31. A heater (not illustrated) is provided along the cavity 31, runner 322 and spool (passage of the mold) 323. This heater ensures that the molten resin having contacted the cavity 31 and passage of the mold will not be solidified by being cooled by thermal conduction and becoming less fluid. Instead of the heater, a temperature regulating water channel can be provided on the mold. FIG. 4 shows the internal surface of the cavity 31 as the outside shape of the reflecting optical element (resin molded article) 1. FIG. 4 also shows the gate 321, runner 322 and spool 323 as an outside shape of the resin passing through them.

(Charging Means)

The charging means 32 is preferably mounted on the mold so that the resin will be charged from the direction of width of the reflecting optical element 1 to the direction of length. The nozzle 324 of the charging means 32 communicates with the spool 323. The charging means 32 has a screw (not illustrated) for extruding the molten resin from the nozzle 324. The screw allows the molten resin to be fed from the nozzle 324 to the spool 323, runner 322 and the gate 321 so that the cavity 31 is filled with resin. The distance traveled from the screw starting position or the time elapsed after start of screw traveling corresponds to the amount of the molten resin to be extruded (injection volume). The volumes of the mold passage from the spool 323 to the gate 321 and the cross sectional profile of the cavity 31 at each position in the direction of length are already known. This makes it possible to calculate the position of the leading edge of the molten resin charged into the cavity 31, based on the distance traveled from the screw starting position or the time elapsed after the start of screw traveling.

(Detecting Means)

The detecting means 33 is a temperature sensor for detecting the temperature on the internal surface of the cavity 31. One or more detecting means 33 including the second region 312 of the internal surface of the cavity 31 for forming the second surface 12 are arranged on the internal surface of the cavity 31 including the bottom surface 313 and double lateral wall surface 314, when the second region 312 is assumed as a top surface. FIG. 4 indicates a detecting means 33 arranged on the bottom surface 313 opposed to the second region 312 (top surface) on the side opposite the second region 312 on the gate side, with respect to the direction of length. The detecting means 33 is not restricted to a temperature sensor if it is a sensor capable of detecting the leading edge of the resin at the time of injection inside the cavity 31. For example, an ultrasonic sensor or magnetic sensor can be used.

The detecting means 33 can detect the leading edge of the resin having reached the second region 312 of the cavity 31. The control means 35 receives the detected temperature t1 from the detecting means 33 through the interface 38 as a detection signal. The control means 35 controls the charging means 32 and stops the resin charging operation, based on the detected temperature t1 from the detecting means 33. The control means 35 also controls the gas filling means 34 to start the compressed gas injection.

By providing the detecting means 33 in a region which is same as the second region 312 in the direction of length and including the second region 312, the surface precision of the first surface portion 11 is not adversely affected by the detecting unit 33. Further, the leading edge of the resin having reached the second region 312 and the leading edge of the hollow portion formed inside the resin are detected directly by the detecting unit 33, and a stop of the resin charging operation and a start of injection operation of compressed gas are controlled in response to this detection signal. Then it becomes possible to elongate the hollow portion to the second surface 12 certainly.

The control means stores prescribe time in the storage means 36. In response to the operation having been performed by the operation means 41, the control means 35 adjusts a prescribed time so that the updated prescribed time is stored in the storage means 36. Adjustment of a prescribed time allows the position of the hesitation mark HM to be adjusted.

(Gas Injecting Means)

The gas filling means 34 includes a tank (not illustrated) for storing the compressed gas, a solenoid valve 341, and an injection outlet 342 communicating with the cavity 31. The control means 35 controls the open/close operation of the solenoid valve 341. Any compressed gas can be used if it does not react or mix with the resin. For example, an inert gas can be used. When safety and economy are taken into account, nitrogen is preferably used because it is non-combustible and non-toxic, and does not require much cost. The injection outlet 342 is located on the bottom surface 313 of the inner surface which oppose to the second region 312 (top surface) of the internal surface of the cavity 31. To be more specific, the injection outlet 342 is provided on the bottom surface within the space between the positions corresponding to the end of the first surface and the end of the optical element. The injection outlet 342 is arranged in the vicinity of the gate and opened toward the direction of length.

(Storage Means)

Figure 5:
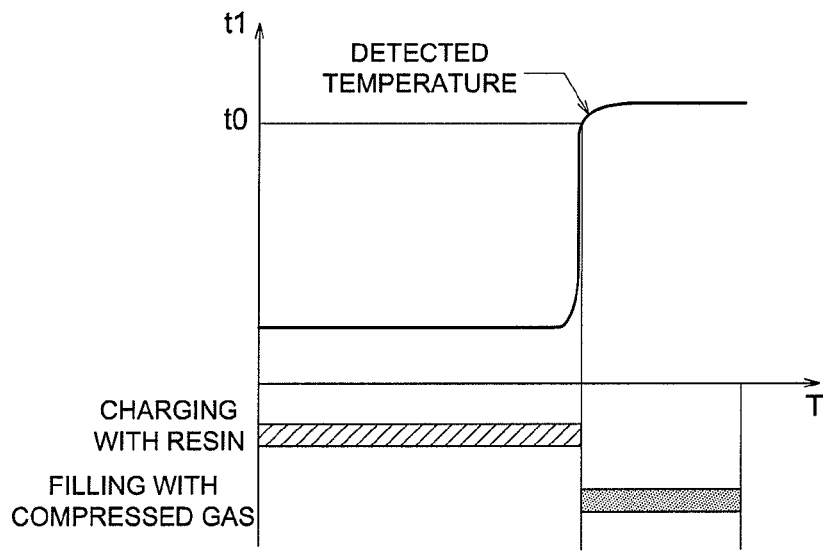
FIG. 5 is a chart representing the relationship among the temperature detected by a detecting means, charging of resin, and filling of compressed gas.

The storage means 36 stores the predetermined reference temperature t0 to be compared with the detected temperature t1 from the detecting means 33. FIG. 5 shows the detected temperature t1 and the reference temperature t0.

(Decision Means)

The decision means 37 compares the detected temperature t1 with the reference temperature t0. If the detected temperature t1 has exceeded the reference temperature t0, the decision means 37 outputs the result of decision to the control means 35. When the leading edge of the molten resin has reached the position of the detecting means 33, the detected temperature t1 detected by the detecting means 33 is determined as the reference temperature t0.

(Control Means)

In response to the detected temperature t1 from the detecting means 33, the control means 35 allows the decision means 37 to compare the detected temperature with the reference temperature. When the decision means 37 has determined that the detected temperature t1 exceeds the reference temperature t0, the control means controls the charging means 32 so that charging of the cavity 31 with resin will be suspended. Further, the control means 35 controls the gas filling means 34 to start injection of compressed gas into the charged resin. The control means 35 suspends the inspection of compressed gas after the elapse of a prescribed time from the start of injection of the compressed gas. FIG. 6 shows the operation of stopping the resin charging, and starting the injection of compressed gas, when the detected temperature t1 has exceeded the reference temperature t0.

When the compressed gas is filled into the charged resin, the hollow portion 4 in the resin can be extended in the direction of length, and formation can reach the second surface 12 along the first surface 11. This ensures that the hollow portion 4 longer than the first surface 11 is formed inside the resin in the direction of length. Thus, the impact of the tensile stress due to thermal contraction can be released by the hollow portion 4 having been formed. This reduces warping of the resin molded product. Further, a hollow portion is formed up to the second surface; namely, the hollow portion is formed longer than the first surface 11 in the direction of length. This permits the effect of the hollow portion to work on the entire mirror surface.

Since the compressed gas is injected before resin is cooled subsequent to suspension of resin charging operation, injection of the gas is preferably started almost simultaneously with suspension, or in the range of 1 to 5 seconds after charging with resin.

Upon receipt of an instruction from the operation means 41, the control means 35 allows the updated reference temperature t0 to be stored in the storage means 36. To adjust the time of stopping the resin changing and starting the compressed gas filling operation, one has only to adjust the temperature t0. The reference temperature t0 can be determined empirically by repeating the test of manufacturing the substrate of the reflecting optical element 1 and by measuring and evaluating the produced reflecting optical element 1. The reference temperature t0 is determined in relative terms according to the material of the substrate of the reflecting optical element 1, temperature of the heating cylinder, and the amount of resin charged per unit time.

The following describes a series of operations: In the first place, the control means 35 controls the charging means 32 to rotate the screw in such a way that molten resin is emitted from the nozzle 324. The resin passes through a spool 323, runner 322 and gate 321, and is changed into the cavity 31 (Step S101). In this case, the solenoid valve 341 is closed. Further, the control means 35 has not yet received a detection signal from the detecting means 33.

The cavity 31 is further charged with molten resin. The tip end of the molten resin having reached the second surface 12 is detected by the detecting means 33. When the control means 35 has received the detection signal of the detecting means 33 (Step S102: Yes), the control means 35 controls the charging means 32, and suspends the cavity 31 to be charged with resin (Step S103). Then the control means 35 controls the gas filling means 34, and releases the solenoid valve 341. This procedure enables the compressed gas in a tank (not illustrated) to be jetted into the cavity 31 from the injection port 342. Since the injection port 342 is arranged on the bottom surface opposed to the second region 312, and the injection port 342 is opened in the direction of length, the charged resin is filled with the compressed gas in the direction of length (Step S104). This procedure permits a hollow portion to be formed in the resin in the direction of length.

Then the molten resin is solidified and cooled by the thermal conduction with the mold. The hollow portion 4 is kept at a prescribed pressure until the resin is solidified and cooled (Step S105). If the pressure is maintained at this level, the first surface 11 is pressed against the first region 311. This enhances the surface transfer property of the first surface 11.

Then the compressed gas is removed from the hollow portion 4, and the mold is opened to remove the reflecting optical element (resin molded product) (Step S106).

In the flow chart illustrated in FIG. 6, when one detecting means 33 is installed on the bottom surface opposed to the second region 312, the control means 35 stops the resin charging operation, and starts the compressed gas filling operation. The present embodiment is not restricted thereto. Namely, when a detecting means 33 is installed on the bottom surface opposed to the second region 312, make setting in advance to determine whether or not the control means 35 should control the charging means 32 and gas filling means 34, depending on the ordinal number of a particular detecting means 33 from which the detection signal has been received. This setting is stored in the storage means 36. In FIG. 6, when the control means 35 has received a detection signal from a prescribed detecting means 33 (Step S102: Yes), the control means 35 controls the charging means 32, and stops the resin charging operation (Step S103). The control means 35 then controls the gas filling means 34 in such a way as to control the start of compressed gas filling operation (Step S104).

(Example of Variation)

Figure 7A:
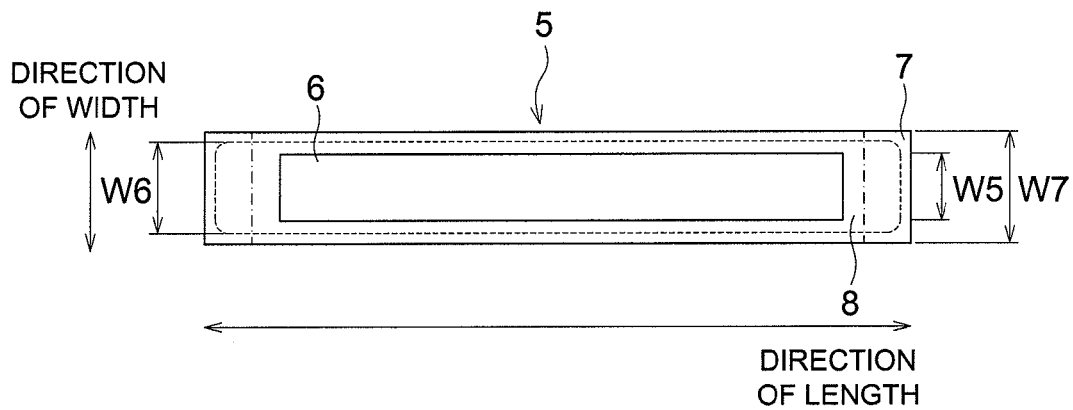
Figure 7B:
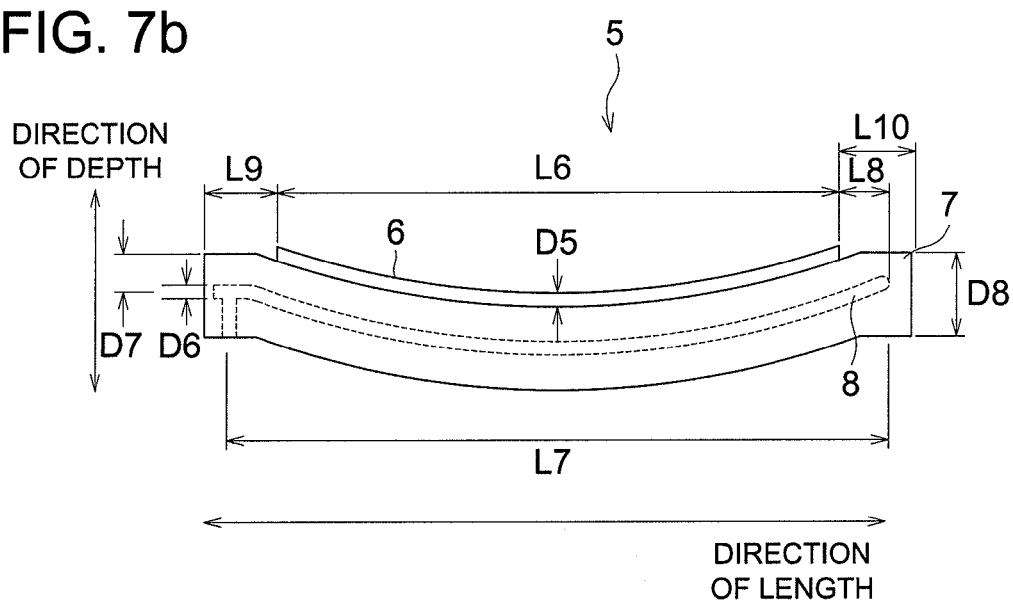
FIG. 7b is a top view of the reflecting optical element as observed from the direction of depth.

Referring to FIG. 7, the following describes an example of variation of the reflecting optical element in the present embodiment. FIG. 7 is a schematic diagram representing the profile of a reflecting optical element in an example of variation. FIG. 7a is a top view of the reflecting optical element as observed from the direction of depth, while FIG. 7b is a top view of the reflecting optical element as observed from the direction of width. The structure is the same as that of the aforementioned reflecting optical element 1, except for the relationship between the length W3 of the mirror surface section 6 in the direction of width and the length W5 of the hollow portion 8. Thus, the following describes only the differences.

In the aforementioned reflecting optical element 1, the length W1 of the mirror surface section 2 in the direction of width and the length W2 of the hollow portion 4 meet the relationship of W1>W2. In the reflecting optical element 5 of the example of variation, however, the length W6 of the hollow portion 4 is greater than the length W5 of the mirror surface section 6, and a relationship of W5<W6 is satisfied. Further, both ends of the hollow portion 8 are formed outside both ends of the mirror surface section 6 in the direction of width. This structure mitigates warping and sink marks resulting from resin contraction, in the direction of width as well, and enhances surface precision.

The length D5 of the mirror surface section 6 protruding from the surface of the substrate 7 in the direction of depth is 0.1 (mm)<D5<3 (mm). When mold release is taken into account, the lateral area of the mirror surface section is increased and the resistance to mold release is also increased.

Thus, the mirror surface precision in the surrounding area will be deteriorated. To avoid this, it is preferred that 0.1 (mm) <$D5 \leq 0.3$ (mm) should be met.

Similarly to the case of FIGS. 1a and 1b, the hollow portion 8 is located at the center both in the direction of width and in the direction of depth and is shown in a plane profile in parallel with the mirror surface section 6 in FIGS. 7a and 7b. It should be noted that this is only intended to give schematic illustration, with imposing any restrictions on the profile and positional relationship of the hollow portion 8.

The reflecting optical element of FIG. 1 or 7 in the present invention shows the profile of a convex mirror as an Example. It should be noted that the reflecting optical element is not restricted to the convex mirror. The present invention is applicable to the cases especially where a high degree of surface precision is required in the direction of a prescribed axis, and the reflecting optical element permits a wide space for the hollow portion to be assigned from the mirror surface section in the direction of this axis.

Embodiment 2

Figure 8:
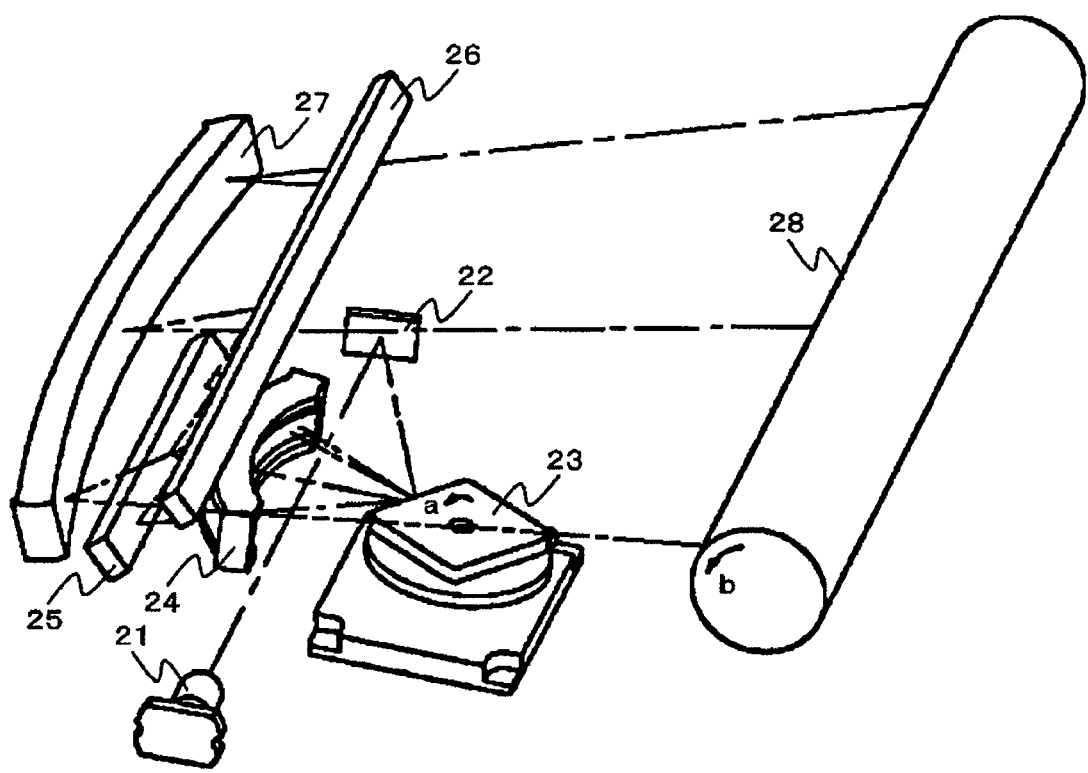
FIG. 8 is a perspective view representing the scanning optical device in a second embodiment of the present invention.

FIG. 8 shows an embodiment wherein the reflecting optical element described in the first embodiment is applied to an fθ mirror in the reflecting type scanning optical device.

FIG. 8 is a perspective view representing a reflecting type scanning optical device. In FIG. 8, the scanning optical device includes a light source means 21, condensing means 22 and 24, polygon mirror 23, plane mirrors 25 and 26, and fθ mirror 27.

The light source means 21 includes a laser diode (not illustrated) and a collimating lens (not illustrated). The laser diode is on-off controlled according to the image information inputted into a drive circuit (not illustrated). Laser beam is emitted in the ON mode. This laser beam is a semiconductor laser of gallium nitride, and the oscillation wavelength is 408 nm. After having been converged into approximately parallel beam by the collimating lens, this laser beam is reflected by the cylindrical mirror as a converging means 22. The shape of beam is converted into the approximately straight line wherein the direction of length is parallel to the main scanning direction, and the beam is led to the polygon mirror 23.

A toric lens as the condensing means 24 has powers different in the main scanning direction and sub-scanning direction. In the sub-scanning direction, the laser beam is converged on the scanned surface. This allows the deflection surface of the polygon mirror 23 and the scanned surface to be kept in the relationship of conjugation. Thus, the surface inclination error of each deflection surface of the polygon mirror 23 is corrected by combination with an extended cylindrical mirror as the aforementioned converging means 23.

The laser beam having passed the converging means 24 is reflected by the plane mirrors 25 and 26, and is again reflected by the fθ mirror 27, whereby the laser beam is converged to the photoreceptor drum 28. The fθ mirror 27 corrects the laser beam deflected at a constant angular velocity in the main scanning direction by the polygon mirror 23 in such a way that the main scanning speed on the scanned surface (on the photoreceptor drum 28) is adjusted to a uniform speed. To put it another way, distortion is corrected.

The photoreceptor drum 28 is driven at a constant speed in the direction of arrow "b". An image is formed on the photoreceptor drum 28, based on the main scanning of the laser beam by the polygon mirror 23 and rotation (sub-scanning) of the photoreceptor drum 28.

If the reflecting type scanning optical device using an fθ lens is employed as a reflecting optical element, as in the present embodiment, the main scanning speed can be changed into a uniform speed without the laser beam passing through the fθ mirror. This makes it possible to avoid the problem of weatherability of the resin optical element that may occur even when using a short-wave laser beam such as a blue laser beam, with the result that high-definition image recording and reproduction can be achieved.

Further, as described above, the optical surface of the fθ mirror is required to provide a high degree of surface precision than that required when the fθ lens is used. The impact on the mirror surface section by warping and sink marks during resin contraction can be mitigated, and a high degree of surface precision is ensured by using the reflecting optical element of the present invention, namely, the reflecting optical element which includes a hollow portion which is longer in the direction of length than the mirror surface section or long both in the directions of length and width, and wherein the entire surface of the mirror surface section is protruding over the surface of the substrate in the direction of width.

It is to be expressly understood, however, that the scanning optical device of the present invention is not restricted to the aforementioned Examples. The present invention can be embodied in a great number of variations with appropriate modification or additions, without departing from the technological spirit. Particularly, the type and arrangement of the optical element used to form the optical path can be selected as desired. Further, the reflecting optical element of the present invention is not restricted to the aforementioned Example, namely, fθ mirror. The present invention can be applied especially to a reflecting optical element wherein a high degree of surface precision is required in the direction of a prescribed axis and a wider hollow portion can be assigned from the mirror surface section.

EXAMPLES

The following describes the present invention with reference to preferred Examples. In the Example and Comparative Example, the fθ mirror 27 of the reflection type scanning optical device described with reference to the second embodiment is used as the resin-made reflecting optical element.

The fθ mirror 27 to be manufactured has the following dimensions: The overall length in the direction of length is 122 mm, the overall width in the direction of width is 20 mm, the overall width is 5 mm, the length of the mirror surface section is 100 mm, and the width of the mirror surface section is 14 mm. The resin molded product wherein the mirror surface section is formed is set to such conditions (resin temperature, mold temperature, injection speed, injection switch-over position, weighing position, holding pressure, holding pressure time, gas pressure, gas pressure time, gas nozzle temperature, etc.) that the surface roughness of the portion wherein the mirror surface section of the hollow portion is formed will be 5 nm or less, and the length of the hollow portion will be 100 nm or more without exceeding 122 mm corresponding to the length in the direction of length of the substrate wherein the mirror surface section is formed. After the molding die is cut and processed as shown in FIG. 3, a hollow portion is formed.

The resin molded product produced in the aforementioned procedure was checked to see that the length of the hollow portion in the direction of length was greater than the length of the substrate in the direction of length, and the surface precision of the substrate wherein the mirror surface section of the resin molded product was measured. As a result, it was possible to manufacture a resin molded product characterized by a high degree of surface precision wherein there was little impact of distortion caused by the resistance to mold release from the molding die and the surface roughness was 5 nm or less, in conformance to the conditions at the time of molding. Thus, a reflecting optical element characterized by surface precision on the same level was produced.

Comparative Example

Unlike the Example, molding operation was performed using the molding die shown in FIG. 3, under the same conditions as those of the Example, except for the molding conditions wherein the length of the hollow portion in the direction of length is smaller than the length of the substrate in the direction of length. In the produced resin molded product, the length of the hollow portion in the direction of length was shorter than the length of the substrate in the direction of length in conformance to the molding conditions. However, the surface precision of the resin molded product was measured to find out that the surface roughness was greater than 5 nm. It was not possible to manufacture a reflecting optical element of high surface precision.

DESCRIPTION OF REFERENCE NUMERALS

1 Reflecting optical element
2 Mirror surface section
3 Substrate
4 Hollow portion
11 First surface
12 Second surface
21 Light source means
23 Polygon mirror
27 fθ mirror
28 Photoreceptor drum (surface to be scanned)
31 Cavity
32 Charging means
33 Detecting means
34 Gas filling means
35 Control means
36 Storage means
37 Decision means
38 Interface
41 Operation means
311 First region
312 Second region
315 Mirror surface section
341 Solenoid valve
342 Injection port

The invention claimed is:

1. A reflecting optical element comprising:
a long tabular resin-made substrate having a hollow portion; and
a mirror surface section located at part of a surface of the substrate,
wherein the hollow portion is located inside the substrate with the mirror surface section formed thereon, and is longer than a distance from a center of the mirror surface section to both ends of the mirror surface section in a direction of length, and the mirror surface section is a reflecting optical element wherein the entire mirror surface section protrudes above the surface of the substrate.

2. The reflecting optical element of claim 1, wherein the hollow portion is further longer than the distance from the center of the mirror surface section to both ends of the mirror surface section in a direction of width.

3. The reflecting optical element of claim 1, wherein the reflecting optical element reflects a light emitted from a light source during an operation of scanning along the surface of the mirror surface section in the direction of length.

4. The reflecting optical element of claim 1, wherein a surface roughness Ra on a surface of the substrate with the mirror surface section of the reflecting optical element formed thereon is preferably formed within a range of $Ra \leqq 5$ (nm).

5. A scanning optical device comprising:
a light source;
a polygon mirror;
a converging unit for inputting a light emitted from the light source and converging the light onto the polygon mirror; and
a reflecting optical element for providing fθ characteristic to the light scanned by rotation of the polygon mirror at a prescribed speed,
wherein the reflecting optical element comprises:
a long tabular resin-made substrate having a hollow portion; and
a mirror surface section located at part of a surface of the substrate,
wherein the hollow portion is located inside the substrate with the mirror surface section formed thereon, and is longer than a distance from a center of the mirror surface section to both ends of the mirror surface section in a direction of length, and the mirror surface section is a reflecting optical element wherein the entire mirror surface section protrudes above the surface of the substrate.

6. The scanning optical device of claim 5, wherein the hollow portion is further longer than the distance from the center of the mirror surface section to both ends of the mirror surface section in a direction of width.

7. The scanning optical device of claim 5, wherein a surface roughness Ra on a surface of the substrate with the mirror surface section of the reflecting optical element formed thereon is preferably formed within a range of $Ra \leqq 5$ (nm).

8. The scanning optical device of claim 5, wherein a wavelength of the light emitted from the light source is 500 nm or less.

* * * * *